United States Patent
Stein et al.

(10) Patent No.: US 10,209,377 B2
(45) Date of Patent: Feb. 19, 2019

(54) METHOD FOR SIGNAL SEPARATION IN SCINTILLATION DETECTORS

(75) Inventors: Jurgen Stein, Wuppertal (DE); Guntram Pausch, Dresden (DE)

(73) Assignee: FLIR Detection, Inc., Stillwater, OK (US)

( * ) Notice: Subject to any disclaimer, the term of this patent is extended or adjusted under 35 U.S.C. 154(b) by 1651 days.

(21) Appl. No.: 11/718,852

(22) PCT Filed: Nov. 8, 2004

(86) PCT No.: PCT/EP2004/052874
§ 371 (c)(1),
(2), (4) Date: Sep. 29, 2008

(87) PCT Pub. No.: WO2006/048048
PCT Pub. Date: May 11, 2006

(65) Prior Publication Data
US 2009/0146073 A1     Jun. 11, 2009

(51) Int. Cl.
*G01T 7/00*     (2006.01)
*G01J 1/16*     (2006.01)
(Continued)

(52) U.S. Cl.
CPC ............... *G01T 7/005* (2013.01); *G01T 1/20* (2013.01); *G01J 1/10* (2013.01); *G01J 1/16* (2013.01);
(Continued)

(58) Field of Classification Search
CPC .......... G01J 11/00; G01J 2011/00; G01J 1/16; G01J 1/10; H03K 3/015; H03K 3/78; H03K 7/08; H03K 21/18; H03K 23/00
(Continued)

(56) References Cited

U.S. PATENT DOCUMENTS 5,071,560 A * 12/1991 McCulloch et al. .......... 210/635
5,367,168 A     11/1994 Berthold et al.
(Continued)

FOREIGN PATENT DOCUMENTS

EP     0642037 A     3/1995
GB     2332512 A     6/1999
JP     06138240 A     5/1994

OTHER PUBLICATIONS

Adamson, P., et al, "The MINOS light-injection calibration system", Nuclear Instruments & Methods in Physics Research, Section—A: Accelerators, Spectrometers, Detectors and Associated Equipment, Oct. 21, 2002, pp. 325-343, vol. 492, No. 3, North-Holland Publishing Co., Amsterdam, NL.
(Continued)

*Primary Examiner* — David P Porta
*Assistant Examiner* — Carolyn Igyarto
(74) *Attorney, Agent, or Firm* — Haynes and Boone, LLP

(57) ABSTRACT

A method of distinguishing effective pulses from test pulses in a scintillation detector that generates measurement light pulses includes providing a regularly-pulsed test light source that produces individual test light pulses having a time-dependent course of relative light intensity, which differs from a time-dependent course of relative light intensity of the measurement light pulses. The test light pulses are provided to a light detector for measurement of the test light pulses. The time-dependent courses of the relative light intensities of the test light pulses are analyzed. The measured pulses are separated into the test light pulses and the measurement light pulses according to the different time-dependent courses of the relative light intensities. The detector includes a scintillator, a light detector, a regularly-pulsed test light source that is adapted provide test light
(Continued)

pulses to the light detector for measurement, and an electronic measuring circuit.

23 Claims, 5 Drawing Sheets

(51) Int. Cl.
*G01J 1/10* (2006.01)
*G01T 1/20* (2006.01)
G01J 1/42 (2006.01)
G01T 1/164 (2006.01)
(52) U.S. Cl.
CPC ............... *G01J 2001/1668* (2013.01); *G01J 2001/4238* (2013.01); *G01T 1/1647* (2013.01)
(58) Field of Classification Search
USPC ..................................................... 250/252.1
See application file for complete search history.

(56) References Cited

U.S. PATENT DOCUMENTS 5,410,153 A      4/1995   Ferreira
6,229,377 B1 *   5/2001   Hoggan et al. ............... 327/411
7,148,483 B1 *  12/2006   Testardi ...................... 250/361 R

OTHER PUBLICATIONS

Hinrichsen, P. F., "A Stabilized Scintillation Counter", IEEE Transactions on Nuclear Science, Jun. 1964, pp. 420-425, vol. NS-11, No. 3, IEEE Inc., New York, US.

Knoll, Glenn F., Radiation Detection and Measurement, 2000, pp. 113-116, 3rd edition, John Wiley & Sons, Inc., U.S.

* cited by examiner

METHOD FOR SIGNAL SEPARATION IN SCINTILLATION DETECTORS

FIELD OF THE INVENTION

The invention relates to a method for separation of effective pulses and test light pulses in scintillation detectors, preferably for detection of ionizing radiation, as well as to a scintillation detector with stabilization.

BACKGROUND OF THE INVENTION

Scintillation detectors are known from prior art. They comprise a scintillator, which can be solid or liquid, in which the radiation to be detected, in particular ionizing radiation, is at least partially absorbed. The absorbed radiation generates excited states in the scintillator which decay under emission of light.

The scintillation detector, moreover, comprises a light detector by means of which the light emitted by the scintillator is measured. In practice, the current light detector is a photo cathode in connection with a photomultiplier, whereby at first the light hits the photo cathode, from which it releases electrons which then are multiplied in the photomultiplier and are amplified such that an electric pulse which can be measured is generated. The present invention, however, can also be used for other light detectors.

Particularly, during use of scintillation detectors outside air conditioned rooms, as for example a lab, the temperature dependence of the amplification, in particular of the light detector, is negatively perceivable. The variation in amplification, in particular of the light detector, which is caused by the environment which is substantially, but not only, caused by different temperatures, therefore, has to be considered during the measurement.

It is known to calibrate the scintillation detector as a whole using a calibration source by exposing the detector to radiation of the calibration source, the characteristics of which, in particular its energy, are exactly known, and which adjust the measurement results to a reference value such that the detector is calibrated as a whole.

This calibration method has the disadvantage that for calibration real events have to be generated which actually overlay the values to be measured. This results in the radiation of low intensity which lies in the energy range of the calibration source, not being detectable or only rather poorly, because it is superposed by the calibration signals or it is completely overlapped. Is the scintillation detector, on the other hand, only calibrated prior and/or after the actual measurement, the response of the amplification due to environmental influences cannot be considered during the current measurement.

It is known that a light detector, in particular the combination of a photomultiplier with a photo cathode, can respond to environmental influences much faster and more significant than the scintillator itself such that a stabilization at least of the light detector during current operation is desirable. Therefore, in prior art the light detector is stabilized separately in that test signals which are generated by a test light source, for example an LED, are directed to the light detector. Regularly, this is carried out such that the light of the LED is coupled into the scintillator and hits the photo cathode of the photomultiplier over the scintillator.

The use of such test light sources enables stabilization of the light detector also during the current measurement of the signals to be detected, the so called effective signals. To not falsify the result therefore, however, it is necessary to separate the test light signals from the effective signals. For this, two methods are known.

To enable the separation of the test light signals from the effective signals in prior art it is suggested to use test light signals, which are larger than the largest and/or smaller than the smallest effective signals. By this, the test light signals measured by the light detector lie outside the spectrums of the effective signals, i.e., the effective spectrum such that these can be distinguished very easy from the effective signals.

This method is disadvantageous in that the dynamic range of the detector has to be larger than it would be required by the effective signals. This leads either to the possible detector resolution not being available or an increase in the electronic complexity for the detector, to increase the dynamic range for calibration purposes. Because the test light signal lies outside the range of effective signals, in principle, it is also not possible to verify the linearity of the characteristic curve of the detector. This is particularly disadvantageous with the use of photomultipliers with photo cathodes as light detectors, because these light detectors are not very linear, and the characteristic curve, moreover, changes with the supply voltage. Finally, in principle it is also not possible to consciously monitor a particularly interesting range of the amplitude or the pulse amplitude spectrum, because this range lies necessarily within the effective spectrum, and even in the middle of its particularly interesting range.

For avoiding these disadvantages it is known to use test light pulses generated by an LED, the amplitude of which is selected such that the pulses occur in the effective spectrum. Thereby, the test light pulses are pulsed in an adequate manner, whereby the test light generator additionally generates an electronic marking, a so called trigger signal, which is recognized and analyzed by the measurement circuit or the spectroscopic electronics of the detector, for example, in that an additional bit is set and read in an analog to digital converter (ADC). This marking enables then electronic separation between effective and test light signal.

This method is detrimental in that the test light generator and the measurement circuit of the detector have to be extraordinarily exactly tuned with respect to each other and, moreover, have to be coupled electronically. This leads to a substantially more complex electronic circuit as it would be necessary for the operation of the detector, associated with the requirement, to use more complex electronic components. From the use of additional circuitry, additional current and energy consumption results, this particularly is disadvantageous with mobile scintillation detectors, which are operated with batteries or accumulators.

Therefore, it is an object of the invention to avoid the disadvantages described above.

BRIEF SUMMARY OF THE INVENTION

According to the invention, this object is solved by a method for separation of effective pulses and test light pulses in scintillation detectors, according to which first a pulsed test light source, preferably a pulsed LED, is selected, the single test light pulses of which have a time-dependent course of the relative light intensity, which differs from the time-dependent course of the relative light intensity of the effective pulses. According to the invention, the test light pulses generated by the test light source are introduced into the light detector of the scintillation detector for measurement of the test light pulses by the light detector. Subsequently, the time-dependent course of the relative light intensities of the pulses measured is analyzed and the pulses measured are separated by utilizing the different time-dependent course of the relative light intensities in test light pulses and effective pulses.

According to the invention, the analysis of the time-dependent course of the relative light intensities of the pulses results by using an adequate electrical circuit. The invention also comprises a method according to which the pulses are digitally sampled, i.e., digitized, wherein the sampling preferably is carried out with a sampling rate between 1 and 1 000 mega-samples per second (MS/s), particularly preferred with a sampling rate between 5 and 100 MS/s, and very particularly preferred with a sampling rate between 10 and 25 MS/s, and wherein the analysis of the time-dependent course of the relative light intensities of the pulses results by means of a predetermined algorithm.

It has been found to be advantageous, when the inventive method uses regularly pulsed test light signals. Thereby, it is particularly preferred, when the test light signals are selected such that they lie at least partially within the effective range, preferably within the specifically sensible effective range, of the effective signals. Moreover, it is favorable, when the test light signals are modulated such that pulse sequences with differently large determinable amplitudes are generated, which preferably lie substantially within the effective range of the effective signals.

The test light source can be operated according to the invention such that at least a pulse sequence having at least one repeatedly occurring test light pulse, is generated, wherein the pulse sequence in the detector is analyzed and is used to determine the amplification factor of the light detector and/or the resolution of the light detector, preferably in dependence of the detected light amount. This method can also be used to stabilize the light detector or to determine the dead time of the scintillation detector. Thereby, dead time denotes the time, in which the scintillation detector after the detection of a signal cannot recognize further signals.

The test light source further can also be operated according to the invention in that at least a pulse sequence having at least two test light pulses of different amplitudes is generated, wherein the pulse sequence is analyzed in the detector and is used to determine the amplification factor of the light detector, and/or to measure the characteristic curve of the light detector and/or the resolution of the light detector, preferably in dependence of the detected light amount. This method can be used to stabilize the light detector or to linearize the characteristic curve of the light detector or to determine the dead time of the scintillation detector.

Also, a method for stabilization of the light detector is disclosed, according to which at first test light pulses are generated and separated as described above. The pulse amplitudes of the test light pulses are analyzed at different times, wherein the difference of the pulse amplitude of the test light pulses, preferably the average pulse amplitude of several test light pulses, is determined with respect to a reference value, and the amplification of the light detector is guided and stabilized in that the difference of the pulse amplitudes of the test light pulses are used as command variable.

The invention also comprises a method for determination of the resolution of a light detector, according to which test light pulses are generated and separated as described above. The pulse amplitudes of the test light pulses are analyzed at different times and the resolution of the light detector is then determined from the scattering of the pulse amplitudes of the test light pulses.

Further, a method for determination of the dead time of a scintillation detector is comprised, according to which at first the test light pulses are generated and separated according to a method described above, wherein a predetermined number of test light pulses are generated in a preset time unit. The signals identified as test light pulses are counted in the preset time unit, wherein the dead time of the scintillation detector is determined by the comparison of the number of the generated test light pulses to the number of the signals identified as test light pulses.

It is particularly advantageous for all of the previously mentioned different embodiments of the inventive method, when the test light signals are recorded parallel to the effective signals during the actual measurement.

Moreover, a scintillation detector is claimed, preferably a scintillation detector with non-stationary power supply, especially preferred a battery operated scintillation detector, having a scintillator and a light detector, wherein the light detector preferably has a photo cathode and a photomultiplier. This scintillation detector according to the invention further comprises a test light source, preferably an LED, wherein the stabilization of this scintillation detector results from the method described above.

In a preferred embodiment the generator for generating the test light signals and the electronic test circuit are electrically separated, especially preferred, the generator for generating the test light signals and the electronic test circuit are mechanically separated.

The method according to the invention as well as the device according to the invention prevent the disadvantages of prior art. According to the method, it is possible, in particular, to use test light pulses within the effective range of the measured effective spectrum and to introduce these absolutely parallel to the current measurement of effective signals and to separate them, without thereby influencing the measured spectrum, because the test light signals can be separated due to their time-dependent course which is different from the effective signals, completely electronically or on the basis of a predetermined algorithm from the effective signals. Due to the parallel use of test light pulses in the range of the effective spectrum the linearity of the detector as well as its resolution, dead time, the shift of the amplification and its stabilization can be deter-mined and controlled very exactly, which is not possible according to common methods. By this, moreover, it is possible, to provide a scintillation detector which can be stabilized in a superior manner and which can be electrically and mechanically constructed much more simple, because it is possible to completely separate the test light signal generator and the analysis electronics electrically and mechanically from each other.

BRIEF DESCRIPTION OF THE DRAWINGS

Several special embodiments of the invention are explained in more detail in connection with FIGS. 1 to 5 in the following.

It is shown in

DETAILED DESCRIPTION OF THE INVENTION

Figure 1A:
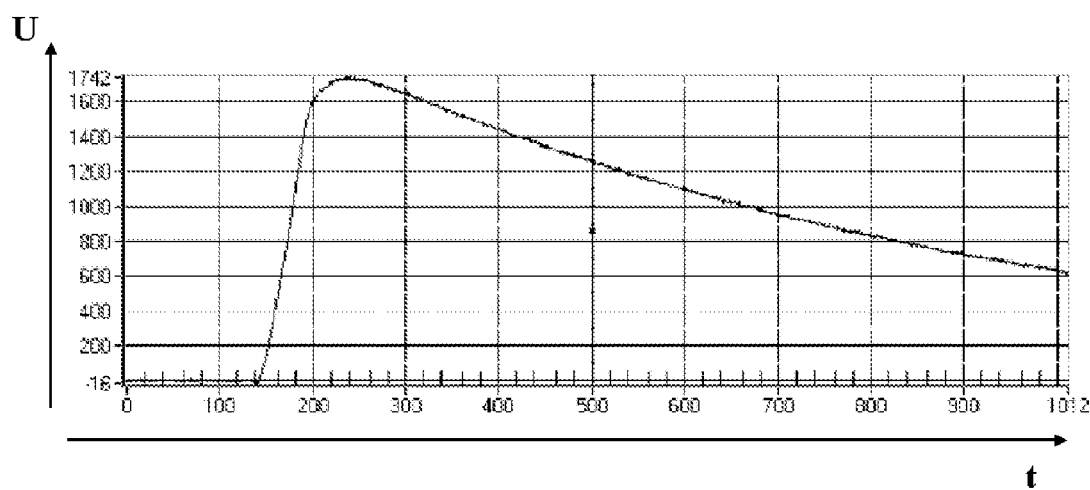
FIG. 1*a*: Output signal at the preamplifier (test light pulse)
Figure 1B:
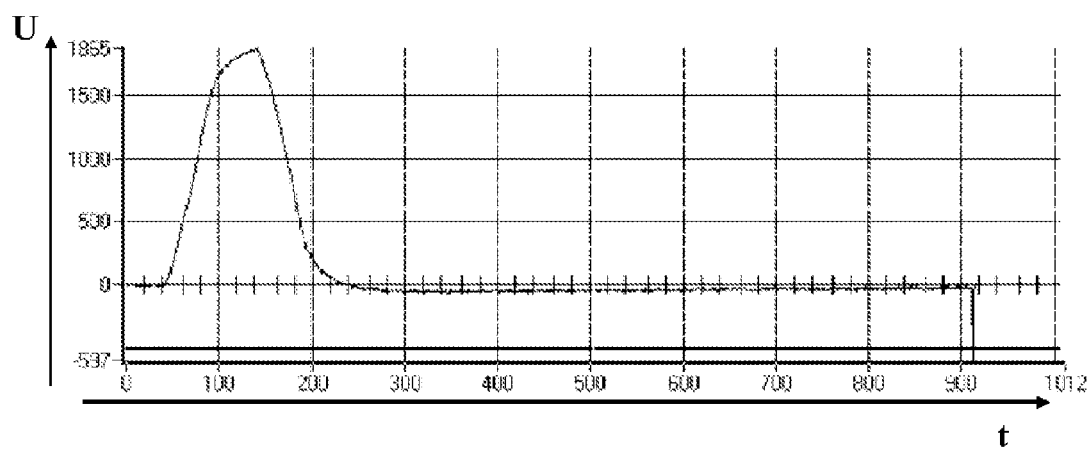
FIG. 1*b*: Test light pulse after filtering.

FIG. 1a shows the output signal which leaves the preamplifier from the test light pulses directed into the light detector of a scintillation detector, generated by means of an LED, as a function of the measured voltage U from time t. FIG. 1b shows the same signal, however, after filtering, wherein here the floating deconvolution or moving window deconvolution (MWD) has been used for filtering. The filtering method of the MWD is known and is described in detail in EP 550 830. Also here, the voltage U is plotted over the time t.

Figure 2A:
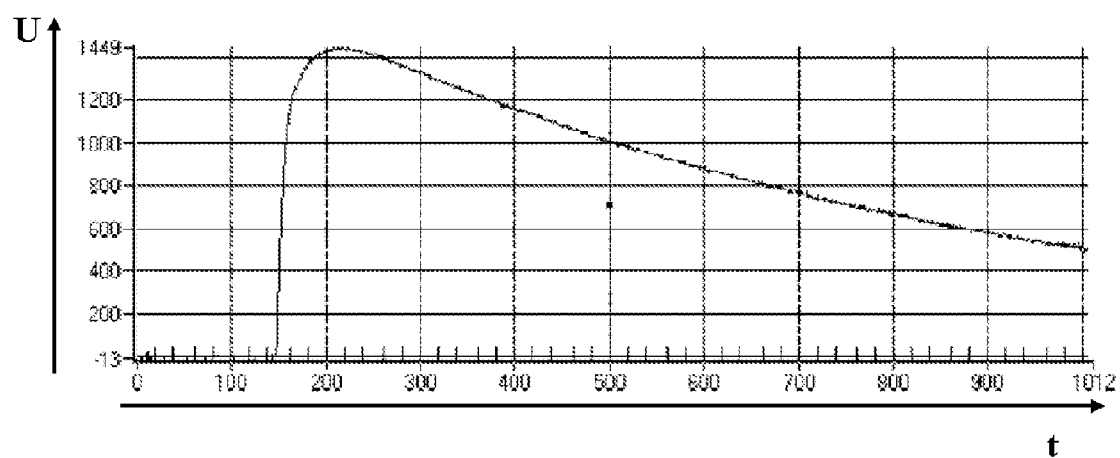
FIG. 2*a*: Output signal from preamplifier (effective pulse)
Figure 2B:
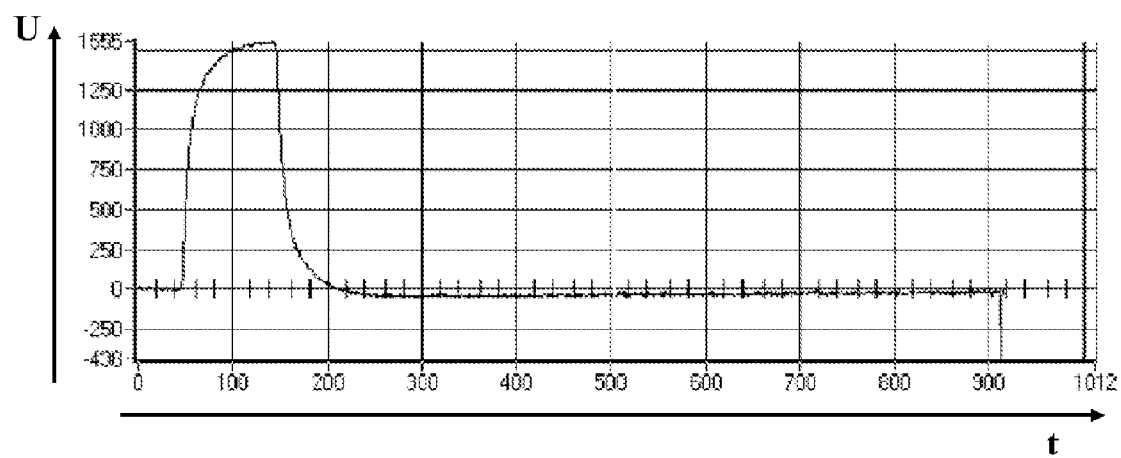
FIG. 2*b*: Effective pulse after filtering.

FIG. 2a shows the signal output at the preamplifier for light in the scintillator generated within the scintillator by the radiation of a γ-calibration source, whereas FIG. 2b shows the same signal after filtering with the MWD. In both figures, the measured voltage U is displayed as a function of the time t.

The representations shown in FIG. 1 and FIG. 2 are results of real measurements, wherein a scintillation detector is used, which has a NaI(Tl)-crystal as well as a photomultiplier with photo cathode as light detector. An LED as test light source is fixedly installed in the scintillation detector.

The LED-driver used for the experiment which varies the LED pulse length program-controlled in a predetermined manner, is electrically and mechanically completely separated from the detector electronics and is embodied as external LED driver. For signal processing, a known preamplifier as well as a timing filter amplifier (TFA) are used. The signals are digitized in the example shown with a CompuScope Waveform Digitizer. The detector signals, thereby, are sampled after the preamplifier with 25 MS/s, wherein the sampling itself here is triggered by an external trigger signal, generated by differentiation and amplification of the detector signals within the TFA. The thus sampled signal is digitally filtered subsequently, wherein in the embodiment, the floating deconvolution is employed as filtering method. Also, the use of other adequate and to the person skilled in the art commonly known filtering methods is well possible.

The filtered signal is then integrated to thereby obtain a signal E, which represents a measure for the energy of the γ-radiation absorbed in the scintillator.

For the embodiment described here, two different alternatively employed pulse form parameters are determined, namely on the one hand the parameter S, which corresponds to the center of gravity of the filtered signal in relation to the trigger time, and on the other hand, the parameter B, which corresponds to the width of the filtered signal. The use of B as pulse form parameter has the advantage that no reference time point has to be determined. This method, therefore, has the further advantage that it can also be used in connection with unsolicited ADC's, whereby the digital sampling is not triggered by a trigger signal such that an external trigger can be omitted completely.

Because the method according to the invention uses the different time-dependent course of test light signals and effective signals, and thereby, the different pulse form of the measured signals, which is reflected in the output signal of the preamplifier as well as in the subsequently filtered signal, as can be clearly derived from FIGS. 1a and 1b as well as 2a and 2b, also the use of other pulse form parameters is possible, for example the signal rise time, according to the present invention, as long as this is adequate to parameterize the time-dependent course in any form.

As test light source, the already mentioned blue LED was used, which was operated with rectangular signals with a voltage of 3.7 V. To have a defined effective spectrum available, a 152Eu source of 1 micro curie activity was used as γ-radiation source in a 5 cm distance from the detector. The time-dependent course of the effective signals is determined by a decade time constant of the scintillator used, which amounts to approximately 250 ns in the NaI(Tl) scintillator used in the described experiment.

During the actual measurement, the pulse length of the light pulses are cyclically varied, and, in fact, concretely within the range $t_{LED}$=i*270 ns with I=2, 3, . . . 8. Thereby, several LED lines are generated in the energy spectrum with substantially equal distance from each other such that, thereby, not only a continuous stabilization but rather also a continuous verification of the linearity of the detector characteristic curve during the actual measurement is possible. Thereby, the differences in the signal form which are already visible to the naked eye when comparing the spectra 1a and 2a and 1b and 2b, respectively, are sufficient to completely separate the test light pulses from the effective pulses.

Figure 3A:
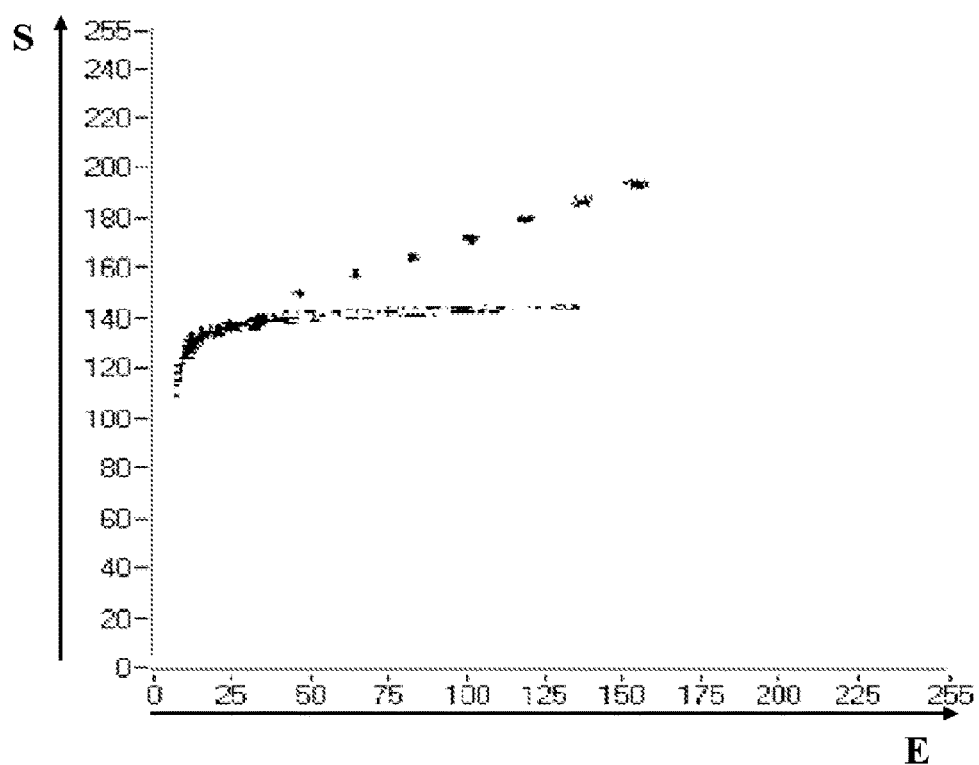
FIG. 3a: Centers of gravity of signals as function of energy (two-dimensional representation)
Figure 3B:
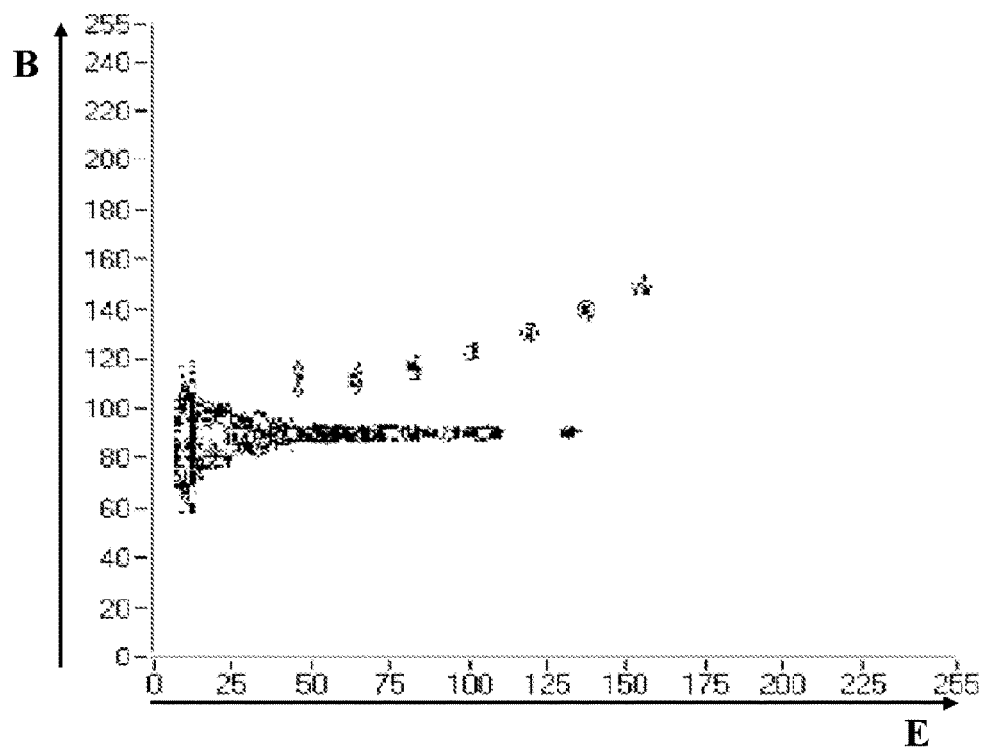
FIG. 3b: Signal width as function of energy (two dimensional representation)

FIG. 3a and FIG. 3b depict in another representational manner how good the signal separation actually functions according to the invention. FIG. 3a shows in a two-dimensional illustration of the measured signals, i.e., the test light signals and the effective signals, the pulse form parameter S as function of the energy E. The substantially continuous range which at first rises with the energy and then as a rather constant value S shows the measured γ-signals, i.e., the effective signals. The seven nearly discrete points above the γ-spectrum show the LED pulses with $t_{LED}$=540 ns, 810 ns, 1,080 ns, 1,350 ns, 1,620 ns, 1,890 ns and 2,160 ns pulse length.

It is clearly recognizable that the different signal types are completely and unambiguously separated from each other, although the test light pulses and the effective pulses occur in the same energy range, i.e., in the effective range of the detector.

A second example, according to which the pulse width B is used as pulse form parameter and is plotted against the measured energy E, is shown in FIG. 3b. Also here, the continuous range of the effective spectrum and the discrete point of the seven LED pulses are clearly separated from each other. From FIG. 3b it can be clearly seen that it is sufficient to qualify all pulses for which E>$E_0$ and B>$B_0$ is valid, as LED pulses, whereas all other pulses are assigned to the effective spectrum, whereby $E_0$ is the energy, beneath which no test light pulses are introduced into the spectrum, and $B_0$ represents the value, underneath which no more LED pulses occur.

Figure 4:
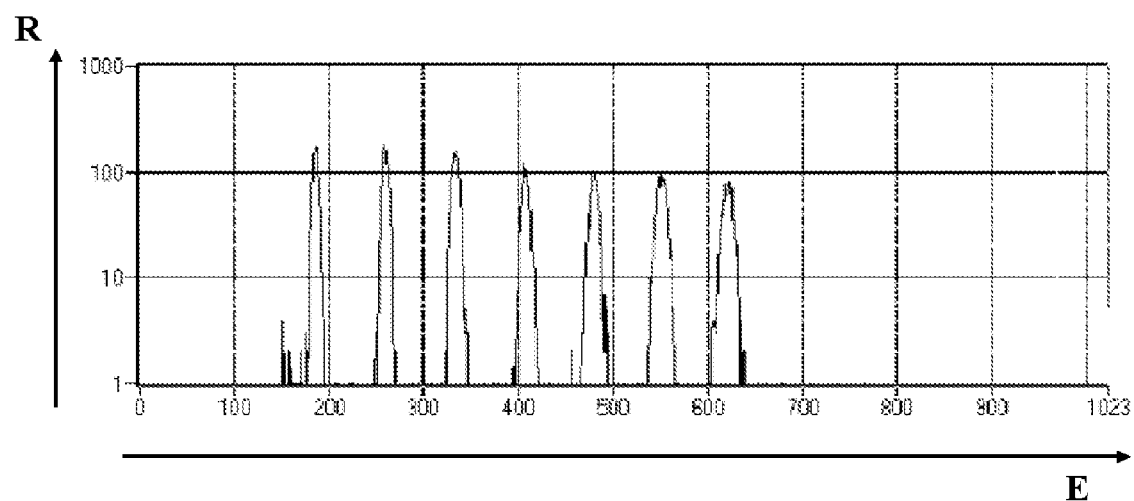
FIG. 4: Spectrum of a pulsed LED after separation of the effective signals.
Figure 5:
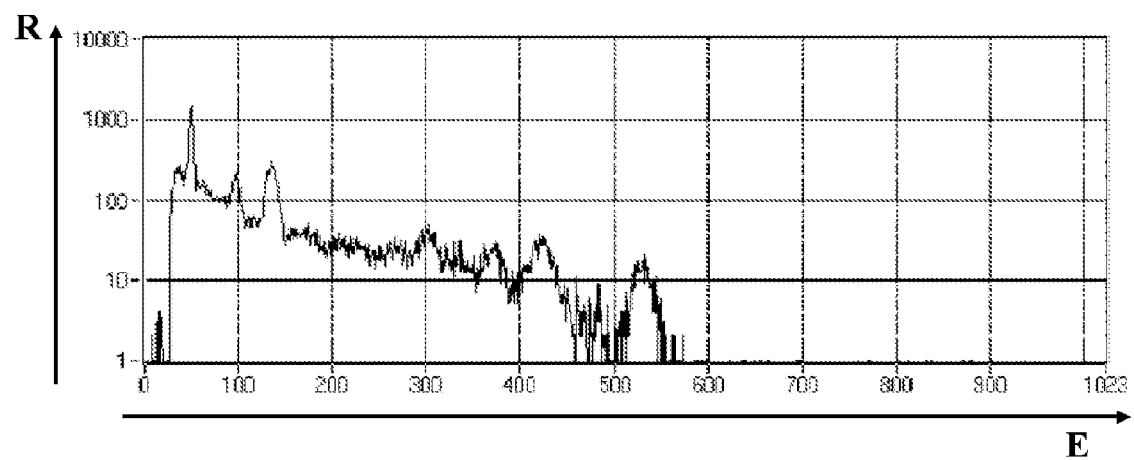
FIG. 5: Spectrum of a $^{152}$Eu-γ-radiation source after separation of the test light signals of the LED.

The results of the signal separation for the second example, using the pulse width B as pulse form parameter, are shown in FIG. 4 and FIG. 5. For both spectra shown there, the number of measured events R is plotted over the energy E, wherein a logarithmic scale has been used for clarification.

In FIG. 4, the spectrum of the test light pulses can be recognized which has been separated by the pulse form in the described manner. Seven peaks can be clearly seen, i.e., clusters of pulses, with the same distance corresponding to the seven different test light pulses. It is very good discernable that the spectrum practically is totally free from events which have them generated by the γ-radiation, i.e., that practically no effective pulses are lost for the effective spectrum in that they are assigned in a wrong manner to the LED spectrum. At the same time, the very good separated test light spectrum is optimally adapted to also recognize only small shifts of the amplification or the change of the linearity of the detector during the current measurement. The measured changes in linearity and/or the amplification of the detector during the current measurement, moreover, can be used to stabilize the output signals of the detector by means of back coupling. From the width of the peaks the resolution of the detector can be determined as function of the light amount (peak location). Moreover, the pulses in the LED spectrum can be counted and from this, the dead time of the detector including the downstream electronics can be determined with known measurement duration and known pulse sequence frequency of the test light pulses.

FIG. 5 shows the associated γ-spectrum of the $^{152}$Eu source, thus, the effective spectrum, which conversely does not have any test light pulses, which shows again that the separation of the test light pulses from the effective pulses by means of a pulse form parameter according to the invention operates very exactly.

Figure 6:
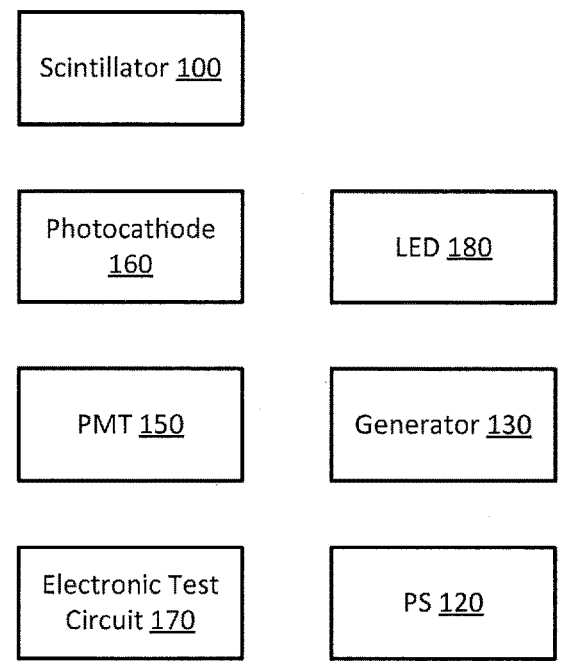
FIG. 6: Block diagram of an exemplary embodiment of a scintillation detector according to the invention.

FIG. 6 shows a block diagram of an exemplary scintillation detector 50 according to the disclosure. Scintillation detector 50 includes a scintillator 100, a light detector in the form of a photocathode 160, a photomultiplier tube 150, a pulsed LED test light source 180 that is adapted to provide test light pulses to light detector 160 for measurement, and an electronic test circuit 170. Electronic test circuit 170 is configured to analyze the time dependent course of the relative light intensities of the pulses measured by the scintillation detector and to separate the measured pulses into test light pulses and effective pulses by using the different time dependent courses of the relative light intensities. Scintillation detector 50 also includes a power supply that can be provided as a non-stationary power-supply 120 (e.g., a battery), and a generator 130 for generating the test light signals. Generator 130 and electronic test circuit 170 may be electrically and/or physically separated from each other.

With the scintillation detector used in the embodiment, separation of the test light pulses from the effective pulses after a sampling and thereby digitizing of the signal to be processed has resulted so that the actual separation has resulted digitally as described above, i.e., by employing predetermined rules and algorithms. Because the different signal types are easily separable, as can be recognized in FIGS. 3a and 3b, it is, however, also possible to realize the separation of the pulses electronically, i.e., substantially analogue. Corresponding electronic elements as pulse form discriminators etc. are known.

The digitizing of the signals and the digital further processing thereby has the additional advantage that the signal processing can be carried out very flexible and a replacement of the pulse form parameter to be used can technically be realized very easily by applying another analysis logic. At the same time it is possible to further refine the method in that various pulse form parameters are analyzed parallel. This, in fact, is also possible, however, it regularly requires an increased use of electronics. The displayed measurement with a sampling rate of 25 MS/s shows that with this sampling rate according to the present method a very good and exact separation of effective from test light pulses can result, because this sampling rate enables a very exact pulse form analysis. Further measurement have led to the surprising result that with the NaI(Tl) scintillator which was employed, a similarly good separation can already be achieved at 10 MS/s, although at the first glance a significant degradation of the results would have had to be expected with this reduction of the sampling rate by a factor of 2,5. The possibility to operate with comparatively low sampling rates is a further advantage of the invention, because a lower sampling rate technically is to be realized easier and requires less energy, which particularly is a substantial advantage with non-stationary hand-held apparatuses. According to the used scintillator, hereby, in dependence of its time constant, other sampling rates can be optimal.

The invention claimed is:

1. A method for determining a resolution of a light detector, comprising:
   distinguishing effective pulses from test light pulses in a scintillation detector that generates measurement light pulses by:
      providing a regularly-pulsed test light source that produces individual test light pulses each having a time-dependent course of relative light intensity that differs from each time-dependent course of relative light intensity of the effective pulses;
      providing the test light pulses generated by the test light source to the light detector of the scintillation detector for measurement of the test light pulses by the light detector while a scintillator is providing the effective pulses to the light detector for measurement;
      analyzing the time-dependent courses of the relative light intensities of the test light pulses measured by the light detector to determine energy signals of the test light pulses and one or more pulse form parameters of the test light pulses as functions of the determined energy signals; and
      separating the measurement light pulses into the test light pulses and the effective pulses according to the different time-dependent courses of the relative light intensities based on the one or more pulse form parameters of the test light pulses;
   analyzing pulse amplitudes of the separated test light pulses at different points in time; and
   determining the resolution of the light detector from a dispersion of the pulse amplitudes.

2. A method according to claim 1, wherein the regularly-pulsed test light source is a pulsed LED.

3. A method according to claim 1, further comprising analyzing the time-dependent courses of the relative light intensities of the effective pulses measured by the light detector to determine energy signals of the effective pulses and one or more pulse form parameters of the effective pulses as functions of the determined energy signals of the effective pulses before separating the measurement light pulses into the test light pulses and the effective pulses, wherein analyzing the time-dependent courses of the relative light intensities of the test light pulses and the effective pulses measured by the light detector is carried out by using an electrical circuit.

4. A method according to claim 1, further comprising digitally sampling the pulses, wherein the separating the measurement light pulses into the test light pulses and the effective pulses according to the different time-dependent courses of the relative light intensities based on the one or more pulse form parameters of the test light pulses includes using a level filter to separate the test light pulses from the effective pulses based, at least in part, on pulse widths, centers of gravity, and/or signal rise times of the test light pulses as functions of the determined energy signals.

5. A method according to claim 4, wherein the sampling is carried out at a sampling rate of between 1 mega-sample per second and 1,000 mega-samples per second.

6. A method according to claim 4, wherein the sampling is carried out at a sampling rate of between 5 mega-samples per second and 100 mega-samples per second.

7. A method according to claim 4, wherein the sampling is carried out at a sampling rate of between 10 mega-samples per second and 25 mega-samples per second.

8. A method according to claim 1, wherein the test light source is selected such that the produced test light pulses lie at least partially within an effective range of the measurement light pulses.

9. A method according to claim 8, wherein the test light source is selected such that the produced test light pulses lie substantially within an effective range of the measurement light pulses.

10. A method according to claim 1, further comprising modulating the test light pulses to generate pulse sequences in which individual pulses have determinable amplitudes of respectively different magnitudes.

11. A method according to claim 10, wherein the test light pulses lie substantially within an effective range of the measurement light pulses.

12. A method according to claim 10, further comprising operating the test light source to generate at least one pulse sequence including at least one repetitive test light pulse,
analyzing the at least one pulse sequence in the scintillation detector, and, according to the analysis results, performing at least one of:
determining an amplification factor of the light detector;
determining a resolution of the light detector;
stabilizing the light detector; and
determining a dead time of the scintillation detector.

13. A method according to claim 10, further comprising:
operating the test light source such that the individual test light pulses include at least one pulse sequence having at least said two test light pulses of different amplitudes,
analyzing the at least one pulse sequence in the light detector and is used for at least one of the following purposes and, according to the analysis results, performing at least one of:
determining the amplification factor of the light detector;
measuring a characteristic line of the light detector;
determining the resolution of the light detector;
stabilizing the light detector;
linearizing the characteristic line of the light detector; and
determining the dead time of the scintillation detector.

14. A method for stabilizing a light detector, comprising:
distinguishing effective pulses from test pulses according to claim 1;
analyzing pulse amplitudes of the test light pulses at different points in time;
determining differences of the pulse amplitudes of the test light pulses with regard to a reference value; and
controlling amplification of the light detector using the differences of the pulse amplitudes of the test light.

15. A method according to claim 14, wherein determining the differences of the pulse amplitudes of the test light pulses with regard to the reference value includes determining the difference of an average pulse amplitude of several test light pulses with regard to the reference value.

16. A method for determining a dead time of a scintillation detector, comprising:
distinguishing effective pulses from test light pulses according to claim 1, including generating a predetermined number of test light pulses in a preset unit of time;
counting signals identified as test light pulses in the preset unit of time; and
comparing a number of the generated test light pulses to the number of the signals identified as test light pulses to determine the dead time of the scintillation detector.

17. A method according to claim 1, further comprising simultaneously mapping the test light pulses and the measurement light pulses during a measurement process.

18. A scintillation detector, comprising:
a light detector;
a scintillator configured to provide effective pulses to the light detector for measurement;
a regularly-pulsed test light source configured to provide individual test light pulses to the light detector for measurement, wherein each individual test light pulse has a time-dependent course of relative light intensity different from each time-dependent course of relative light intensity of the effective pulses; and
an electronic test circuit, wherein the electronic test circuit is configured to:
provide the individual test light pulses to the light detector for measurement while the scintillator is providing the effective pulses to the light detector for measurement;
distinguish the effective pulses from the test light pulses by determining energy signals of the test light pulses and one or more pulse form parameters of the test light pulses as functions of the determined energy signals and separating the test light pulses and the effective pulses according to the different time-dependent courses of the relative light intensities based on the one or more pulse form parameters of the test light pulses;
analyze pulse amplitudes of the separated test light pulses at different points in time; and
determine a resolution of the light detector from a dispersion of the pulse amplitudes.

19. A scintillation detector according to claim 18, further comprising a non-stationary power-supply.

20. A scintillation detector according to claim 18, wherein the light detector includes a photo cathode and photomultiplier.

21. A scintillation detector according to claim 18, wherein the regularly-pulsed test light source includes a pulsed LED.

22. A scintillation detector according to claim 18, wherein the light source and the electronic test circuit are electrically separated from each other.

23. A scintillation detector according to claim 18, wherein the light source and the electronic test circuit are mechanically separated from each other.

* * * * *